(12) United States Patent
Levisse et al.

(10) Patent No.: US 12,247,574 B2
(45) Date of Patent: *Mar. 11, 2025

(54) DEVICE FOR CENTERING AND GUIDING A SHAFT OF AN AIRCRAFT TURBINE ENGINE

(71) Applicant: SAFRAN AIRCRAFT ENGINES, Paris (FR)

(72) Inventors: Paul Ghislain Albert Levisse, Moissy-Cramayel (FR); Emmanuel Fabrice Marie Baret, Moissy-Cramayel (FR); Julien Fabien Patrick Becoulet, Moissy-Cramayel (FR); Alexandre Jean-Marie Tan-Kim, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/550,408

(22) PCT Filed: Mar. 9, 2022

(86) PCT No.: PCT/FR2022/050425
§ 371 (c)(1),
(2) Date: Sep. 13, 2023

(87) PCT Pub. No.: WO2022/195198
PCT Pub. Date: Sep. 22, 2022

(65) Prior Publication Data
US 2024/0151238 A1 May 9, 2024

(30) Foreign Application Priority Data
Mar. 18, 2021 (FR) ...................................... 2102711

(51) Int. Cl.
*F04D 29/059* (2006.01)
*F01D 25/16* (2006.01)
*F16C 27/04* (2006.01)

(52) U.S. Cl.
CPC ......... *F04D 29/059* (2013.01); *F01D 25/164* (2013.01); *F16C 27/045* (2013.01);
(Continued)

(58) Field of Classification Search
CPC ................. F01D 25/164; F01D 21/045; F16C 19/00–56; F16C 27/00–045;
(Continued)

(56) References Cited

U.S. PATENT DOCUMENTS 6,325,546 B1 * 12/2001 Storace ................. F01D 25/164
384/624
9,109,622 B2 * 8/2015 Meacham ............... F16C 33/02
(Continued)

FOREIGN PATENT DOCUMENTS

| CN | 103244276 A | 8/2013 |
|---|---|---|
| FR | 2 519 101 A1 | 7/1983 |

(Continued)

OTHER PUBLICATIONS

International Search Report mailed Apr. 28, 2022, issued in corresponding International Application No. PCT/FR2022/050425, filed Mar. 9, 2022, 6 pages.
(Continued)

*Primary Examiner* — Topaz L. Elliott
(74) *Attorney, Agent, or Firm* — CHRISTENSEN O'CONNOR JOHNSON KINDNESS PLLC

(57) ABSTRACT

A device for centering and guiding a shaft of an aircraft turbine engine is provided. The device includes an outer ring of a rolling bearing extending about an axis and having orifices, an annular bearing support extending about the axis
(Continued)

and at least partially about the ring, the support having orifices and a series of studs for connecting the ring to the support. The studs can be distributed about the axis and extend parallel to the axis. The ends of first studs can be engaged without clearance in the orifices, and ends of second studs can be engaged with clearances in the orifices of the ring and/or of the support, the clearances being configured so that the device has different stiffnesses in at least two directions perpendicular to the axis.

9 Claims, 6 Drawing Sheets

(52) U.S. Cl.
CPC ...... *F05D 2240/54* (2013.01); *F05D 2250/14* (2013.01); *F05D 2260/96* (2013.01)

(58) Field of Classification Search
CPC ........ F16C 27/066; F16D 1/033; F16D 1/076; F16F 15/02–085; F04D 29/059; F05D 2240/54; F05D 2250/14; F05D 2260/96
See application file for complete search history.

(56) References Cited

U.S. PATENT DOCUMENTS

| | | | |
|---|---|---|---|
| 11,891,905 B2* | 2/2024 | Bhujabal | F02C 7/06 |
| 12,031,448 B2* | 7/2024 | Levisse | F16F 15/0237 |
| 2008/0188899 A1* | 8/2008 | Bottlang | A61B 17/8057 |
| | | | 606/301 |
| 2008/0267766 A1* | 10/2008 | Meacham | F16C 27/04 |
| | | | 415/170.1 |
| 2013/0051982 A1* | 2/2013 | Hindle | F01D 25/164 |
| | | | 415/119 |
| 2013/0051990 A1* | 2/2013 | Palmisano | F01D 25/164 |
| | | | 29/889.1 |
| 2013/0287327 A1* | 10/2013 | Hammond | F01D 5/027 |
| | | | 384/441 |
| 2014/0119893 A1* | 5/2014 | Servant | F02K 3/06 |
| | | | 415/123 |
| 2015/0267710 A1* | 9/2015 | Nagai | F04D 17/122 |
| | | | 415/170.1 |
| 2016/0177765 A1* | 6/2016 | Lemoine | F01D 11/005 |
| | | | 415/214.1 |
| 2017/0002863 A1* | 1/2017 | Kawashita | F16C 35/02 |
| 2017/0353078 A1* | 12/2017 | Post | F16C 32/041 |
| 2019/0234458 A1* | 8/2019 | Taguchi | F16C 19/06 |
| 2019/0338675 A1* | 11/2019 | Schmidt | F01D 15/12 |
| 2020/0141280 A1* | 5/2020 | Kusakabe | F01D 25/16 |
| 2021/0348522 A1* | 11/2021 | Demitraszek, Sr. | F01D 25/16 |
| 2023/0016830 A1* | 1/2023 | Kuckhoff | F16D 1/033 |
| 2023/0061131 A1* | 3/2023 | Bhujabal | F16C 27/04 |
| 2024/0151158 A1* | 5/2024 | Bhujabal | F01D 5/06 |
| 2024/0151159 A1* | 5/2024 | Levisse | F02C 7/06 |
| 2024/0151182 A1* | 5/2024 | Levisse | F01D 25/164 |

FOREIGN PATENT DOCUMENTS

| | | | |
|---|---|---|---|
| FR | 3 091 902 A1 | | 7/2020 |
| FR | 3120899 A1 | * | 9/2022 |
| GB | 2 111 137 A | | 6/1983 |
| GB | 2 310 258 A | | 8/1997 |

OTHER PUBLICATIONS

Written Opinion mailed Apr. 28, 2022, issued in corresponding International Application No. PCT/FR2022/050425, filed Mar. 9, 2022, 5 pages.

* cited by examiner

DEVICE FOR CENTERING AND GUIDING A SHAFT OF AN AIRCRAFT TURBINE ENGINE

TECHNICAL FIELD OF THE INVENTION

This invention relates to a device for centring and guiding an aircraft turbine engine shaft.

TECHNICAL BACKGROUND

An aircraft turbine engine comprises shafts, such as a low-pressure shaft and a high-pressure shaft, which are centred and guided in rotation by bearings, generally rolling bearing, for example roller or ball bearings.

A rolling bearing comprises outer and inner rings between which the rollers or the balls are arranged. The inner ring is secured to the shaft to be guided and the outer ring is attached to a bearing support which is a rigid part of the turbine engine stator.

A turbine engine shaft can reach a very high speeds, typically between 2,000 and 30,000 rpm. Such speeds induce excitations of the eigen-modes of the shafts, which can have harmful effects on the motor if the mode responds strongly.

In order to control the position of the mode, the bearings are usually combined with flexible cages that allow the boundary conditions of the shaft to be relaxed and lower the frequency of the eigen-mode. This may allow the mode to be lowered below the operating range.

In this application, "flexible cage" means a member or an assembly that provides a flexible connection between the outer ring of a bearing and its support. The flexibility of this cage is generally ensured by a capacity for elastic deformation of this cage, for example in torsion and/or bending. To provide this capability, the cage comprises at least one series of studs distributed around the axis of the bearing and extending substantially parallel to this axis.

There are currently two flexible cage technologies for bearings.

The first technology described in the documents FR-A1-3 009 843 and FR-A1-3 078 370 is a monobloc flexible cage. A cage of this type generally comprises an inner cylindrical wall to which the outer ring of the bearing is attached or integrated, and an outer cylindrical wall or an attachment flange for attaching to the bearing support. The walls are connected by a series of generally C-shaped studs or two series of studs extending around each other and connected together. The studs and the walls are then formed from a single piece.

A second technology described in the document FR-A1-3 009 843 concerns a cage obtained by assembling independent studs with the support and the ring. Each stud comprises an elongated body and connected at a first longitudinal attachment end for attaching to the support and at a second longitudinal attachment end for attaching to the ring.

In the current technique, the body has a circular cross-sectional shape, i.e. an axisymmetric shape (the cross-sectional shape of the body of the stud is symmetrical in relation to the longitudinal axis of this body). The flexible cage equipped with these studs also has an axisymmetric shape and its stiffness is identical whatever the transverse direction of the load forces of the cage.

The prior art also comprises technologies described by FR-A1-3 091 902, FR-A1-2 519 101, GB-A-2 3100 258, US-A1-2016/177765, GB-A-2 111 137 or CN-B-103 244 276.

The invention proposes an improvement to this second technology, which in particular allows to adapt the stiffness of the flexible cage as a function of the direction of load.

SUMMARY OF THE INVENTION

The invention proposes a device for centring and guiding an aircraft turbine engine shaft, this device comprising:
- an outer ring of a rolling bearing, the ring extending around an axis and comprising orifices arranged around this axis and oriented parallel to this axis,
- an annular bearing support extending around the axis and at least partly around the ring, this support comprising orifices arranged around this axis and oriented parallel to this axis, and
- a series of studs connecting the ring to the support, these studs being distributed around the axis and extending substantially parallel to this axis, each of these studs comprising a first longitudinal end engaged in one of the orifices of the ring and a second longitudinal end engaged in one of the orifices of the support,
characterised in that some of the studs, referred to as first studs, have their ends engaged without clearance in the orifices, and the other studs, referred to as second studs, have their ends engaged with clearances in the orifices of the ring and/or the support, the clearances being configured so that the device has different stiffnesses in at least two directions perpendicular to said axis.

Regardless of the position of the studs around their respective axes, a device using the prior technique equipped with studs with axisymmetric bodies has the same stiffness in all transverse directions (perpendicular to the axis). This means that the stiffness of the device in a first direction perpendicular to the axis (for example in a horizontal plane) is identical to the stiffness of the device in a second direction perpendicular to the axis (for example in a vertical plane).

In contrast, the invention allows the device to be given different stiffnesses depending on the transverse directions of load. In fact, the clearances are oriented in a given direction so that the device has a lower stiffness when it is loaded in this given direction. Advantageously, the device comprises two different stiffnesses in transverse directions. To stabilise a shaft, it is particularly useful to provide different stiffnesses in two transverse directions that are perpendicular to each other, as this allows to reduce the speed at which instabilities appear in the shaft guided by the device. Thanks to the formation of the flexible cage by assembling studs, the invention is advantageous because it allows a multitude of possible configurations while limiting the cost of the device. In the case of a monobloc flexible cage, for example, a change of characteristic would require the production of a new part. In the development phase, this would mean additional costs and delays, especially in the event of an error in the dimensioning of the prototype part. The time required to produce a new part would be incompressible.

It is also understood that the invention covers all combinations of shapes for the cross-sections of the ends of the studs and the respective orifices of the ring and of the support. These shapes can be chosen from a circular or non-circular shape such as oblong, elliptical, rectangular or trapezoidal.

The device according to the invention may comprise one or more of the characteristics below, taken alone with each other or in combination with each other:
when the device is loaded in a first direction perpendicular to the axis, the second studs move in the clearances and the first studs remain stationary, and when the device is loaded in a second direction perpendicular to the axis, different from the first direction, the first and the second studs remain stationary in their respective orifices;

the directions are perpendicular to each other;

the first studs alternate with the second studs around the axis;

the first and second ends of the studs are circular in cross-section;

the orifices of the ring and of the support comprise first orifices which are circular in cross-section, and second orifices which are oblong or elliptical in cross-section;

the second orifices are oriented so that they have an elongated shape in the same direction;

the orifices are formed in annular flanges on the ring and of the support;

the outer ring comprises an outer cylindrical surface defining with an inner cylindrical surface of the support an annular space for forming a damping oil film.

The invention also relates to an aircraft turbine engine, comprising at least one device as described above.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
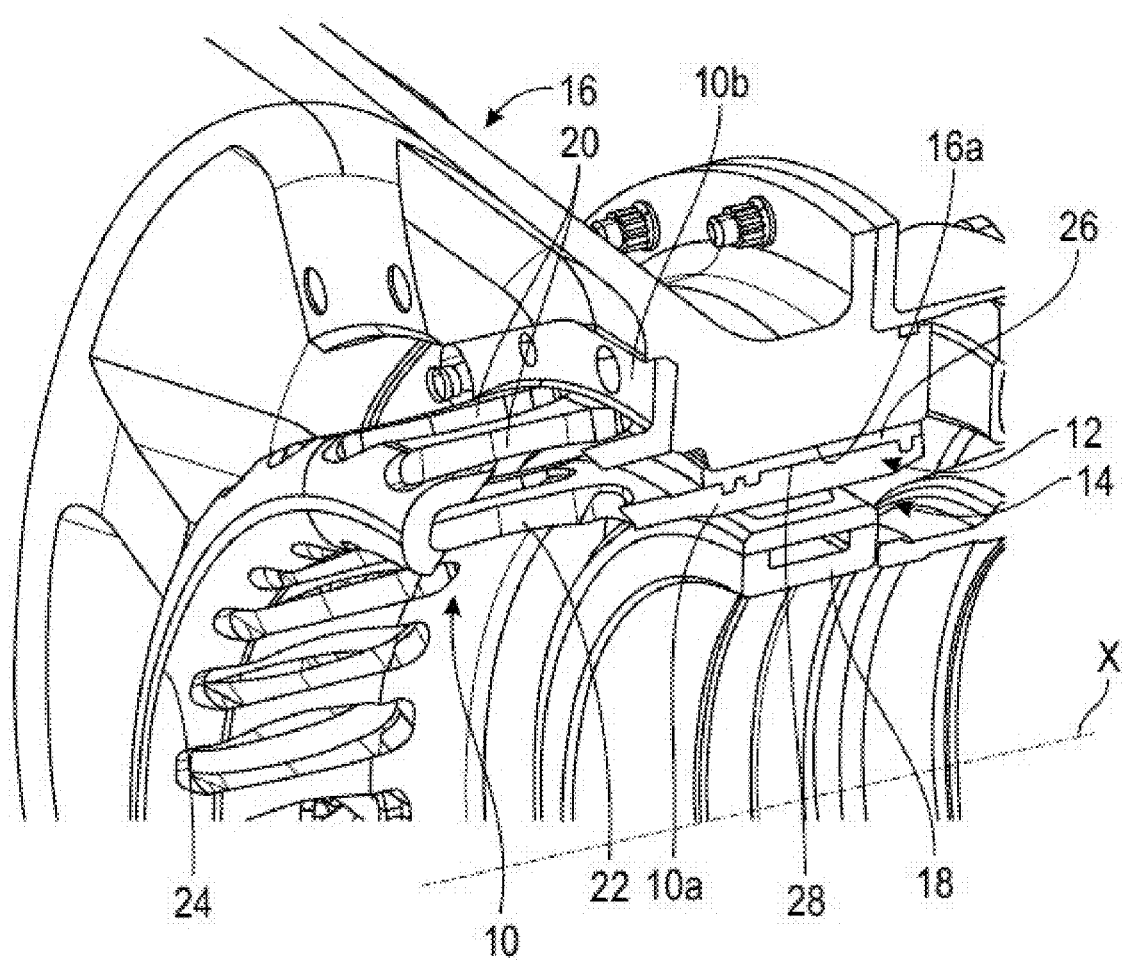
FIG. 1 is a schematic axial cross-section and perspective view of a device for guiding and centring an aircraft turbine engine bearing, according to prior technology.

Reference is first made to FIG. 1, which shows a first monobloc flexible cage technology 10 according to the prior art.

The flexible cage 10 ensures the connection of an outer ring 12 of a rolling bearing 14 to an annular support 16 of this bearing 14.

In addition to the outer ring 12, the bearing 14 comprises an inner ring 18 which is secured to a shaft of the turbine engine, which is not shown. The rings 12, 18 define a roller raceway in the example shown.

The outer ring 12 is integrated into an inner cylindrical wall 10a of the cage 10, which comprises a radially outer annular flange 10b for attaching to the support 16 by screw-nut type means (not shown).

The cage 10 comprises two series of studs 20, 22, radially internal and external respectively in relation to the axis X of the bearing 14 and of the shaft it guides.

The studs 20, 22 are distributed around the axis X and extend parallel to this axis. The studs 20 extend around the studs 22 and have a first of their longitudinal ends which is connected to the flange 10b, and a second of their longitudinal ends which is connected to the other studs 22 by an annular segment 24 with a C-shaped cross-section of the cage 10. The studs 22 extend from the wall 10a, in line with it, to this segment 24.

The support 16 forms part of a stator of the turbine engine and here has a substantially frustoconical general shape. At its inner periphery, it comprises an inner cylindrical surface 16a for shrink-fitting an annulus 26 which extends around the wall 10a of the cage and which defines with the latter an annular space 28 supplied with oil in order to form an oil film for damping the vibrations transmitted by the bearing 14 during operation.

Figure 2:
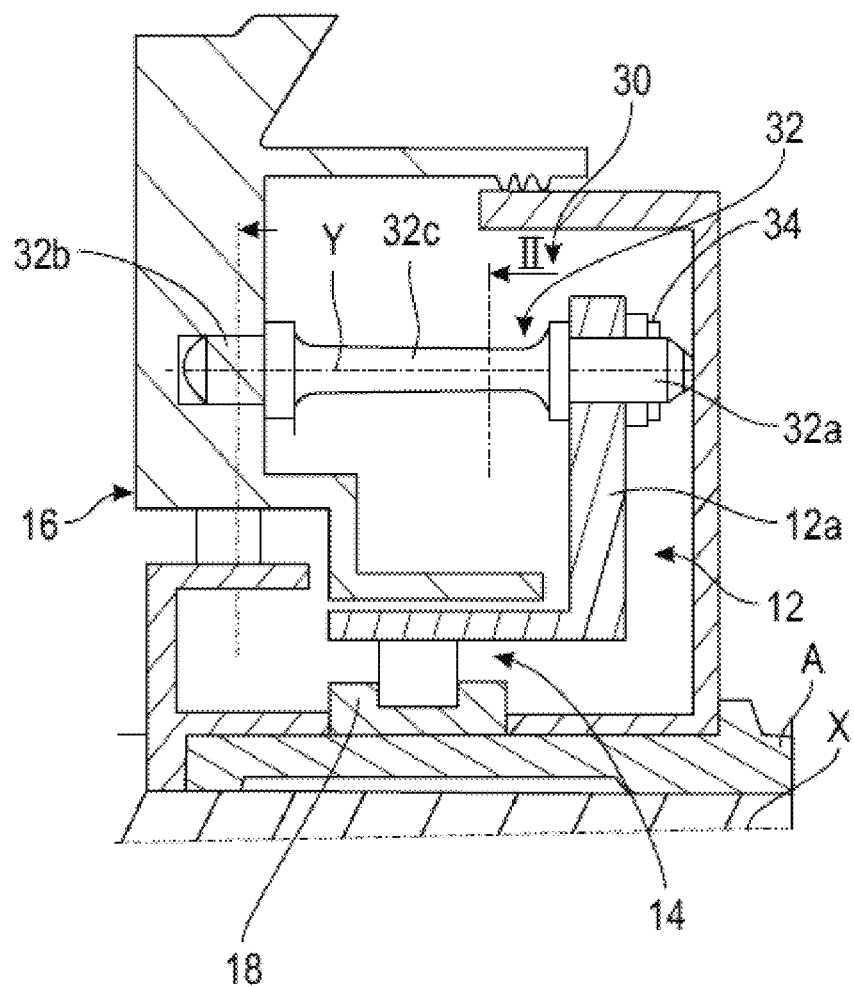
FIG. 2 is a schematic view in axial cross-section of another device for guiding and centring an aircraft turbine engine bearing, according to the prior technology.

FIG. 2 shows a second flexible cage technology 30 with independent studs 32, according to the prior technique.

The flexible cage 30 also ensures the connection of an outer ring 12 of a rolling bearing 14 to an annular support 16 of this bearing 14.

In addition to the outer ring 12, the bearing 14 comprises an inner ring 18 which is secured to a shaft A of the turbine engine. The rings 12, 18 define a roller raceway in the example shown.

The outer ring 12 comprises a radially outer annular flange 12a which comprises orifices through which the ends 32a of the studs 32 pass. These ends 32a are threaded and receive nuts 34 tightened against the flange 12a.

The opposite ends 32b of the studs 32 are attached in holes in the support 16.

The cage 30 comprises a series of studs 32 which are distributed around the axis X and extend parallel to this axis. The studs 32 each comprise a body 32c which is circular in cross-section, and are therefore symmetrical with respect to their axis Y. The studs 32 are also symmetrical to each other about the axis X.

The flexible cage 30 is therefore "axisymmetric", and the stiffness of the cage 10 and of the bearing 14 is therefore the same in all transverse directions (perpendicular to the axis X).

However, from a dynamic point of view, it can be interesting to have different stiffnesses in two orthogonal directions: this provides a stabilising effect to the device by delaying the speed of appearance of instabilities due to the inner damping of the shaft. In fact, by creating different flexibilities in at least two directions, at least two modes appear, as opposed to a single mode in the axisymmetric case.

In the case where the initial radial stiffness of the axisymmetric cage K is such that K1<K<K2 where K1 and K2 are the stiffnesses of the asymmetric flexible cage respectively in the different directions 1 and 2 transverse to the axis X, then the frequencies of the modes created will be within the frequency of the initial single mode.

In this case, the frequency with which instabilities can occur is increased, thereby allowing to limit the risk of potentially damaging instability for the engine.

The control of the movement of the shaft in azimuth can also be used to improve the performance of the engine. Under mechanical or thermal loading, the motor casing deforms, and these distortions generate different clearance openings and closures depending on the azimuth. This implies a degradation in motor performance which could be limited if the dynamic displacement is optimised to compensate for some of the distortion, for example by stiffening the flexible cage in the direction of clearance closure and softening it in the direction of the clearance opening.

The present invention allows to meet this need by means of axisymmetric studs, some of which are engaged without clearance and others of which are mounted with clearances in the outer ring 12 and the support 16.

FIGS. 3 to 6 illustrate an embodiment of a device for centring and guiding an aircraft turbine engine shaft.

The device comprises:

- an outer ring 12 of a rolling bearing 14, this ring extending about an axis X and comprising orifices 42a, 42b arranged about this axis X and oriented parallel to this axis X,
- an annular bearing support 16 extending around the axis X and at least partly around the ring 12, this support 16 comprising orifices 44a, 44b arranged around this axis X and oriented parallel to this axis X, and
- a series of studs 40, 41 connecting the ring 12 to the support 16.

The studs 40, 41 are distributed around the axis X and extend substantially parallel to this axis X. Each of these studs 40, 41 comprises an elongate body 40c, 41c extending between a first longitudinal end 40a, 41a and a second longitudinal end 40b, 41b. Each of the first ends 40a, 41a is engaged in one of the orifices 42a, 42b of the ring 12 and each of the second ends 40b, 41b is engaged in one of the orifices 44a, 44b of the support 16.

First studs 40 and second studs 41 can be distinguished from the studs 40, 41. The first studs 40 have their ends 40a, 40b engaged without clearance in the orifices 42a, 44a in the ring 12 and the support 16. The second studs 41 have their ends 41a, 41b engaged with clearances in the orifices 42b, 44b in the ring 12 and/or the support 16. It is understood that the first end 41a of a stud 41 can be engaged with clearance in an orifice 42b of the ring 12 and that the second end 41b can be engaged without clearance in an orifice 44b of the support 16. It is also understood that the first end 41a of a stud 41 can be engaged without clearance in an orifice 42b of the ring 12 and that the second end 41b can be engaged with clearance in an orifice 44b of the support 16. It is also understood that the first end 41a of a stud 41 can be engaged with clearance in an orifice 42b of the ring 12 and that the second end 41b can be engaged with clearance in an orifice 44b of the support 16. The clearances are configured so that the device has different stiffnesses in at least two distinct directions perpendicular to the axis X.

The two directions perpendicular to the axis X are preferably perpendicular to each other.

In what follows, we are interested in the case where the two ends 41a, 41b of the second studs 41 are engaged with clearances in the orifices 42b, 44b of the ring 12 and the support 16.

Figure 3:
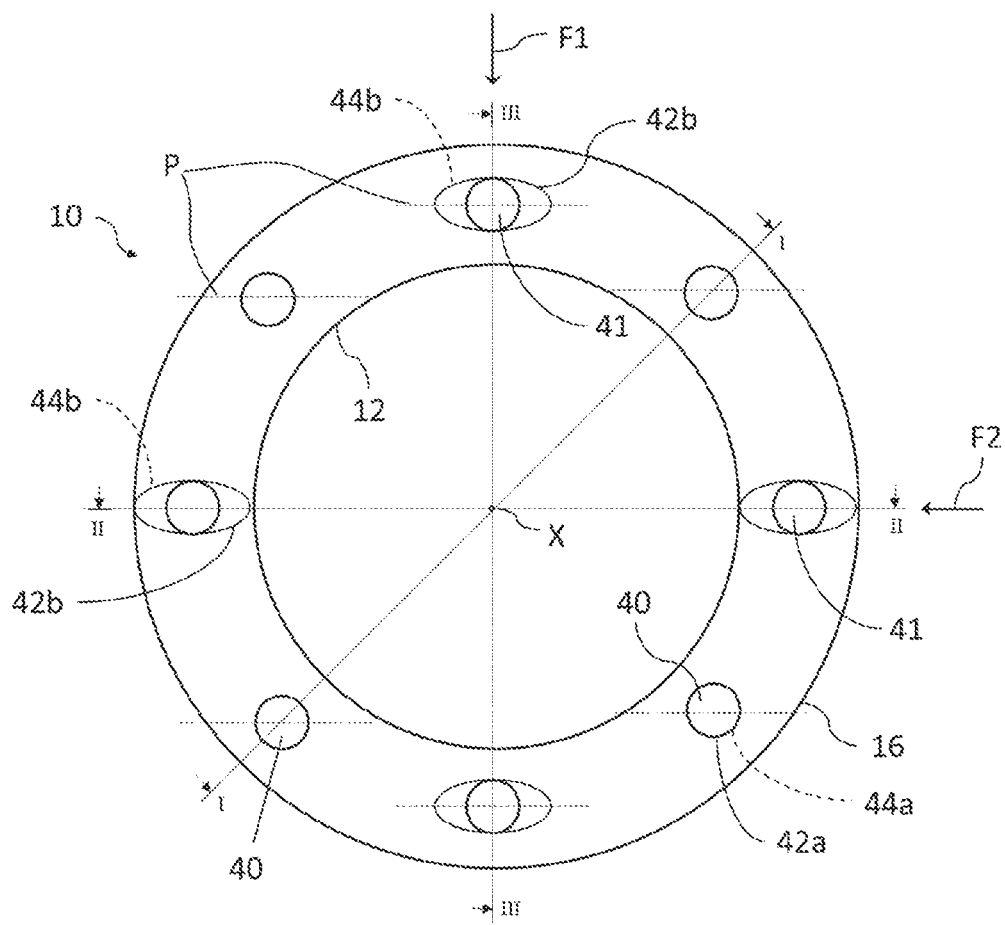
FIG. 3 is a very schematic cross-sectional view of a device for guiding and centring an aircraft turbine engine bearing according to one embodiment of the invention.

In the example of embodiment shown in FIG. 3, the first studs 40 alternate with the second studs 41 around the axis X. It is understood that at least one first stud 40 can be comprised between two second studs 41 around the axis X and that at least one second studs 41 can be comprised between two first studs 40 around the axis X. In other words, the number of first studs 40 comprised between two second studs 41 can be different from one. The number of second studs 41 between two first studs can also be different from one.

Advantageously, the first ends 40a, 41a of the studs 40, 41 are generally circular in cross-section. The second ends 40b, 41b also advantageously have a generally circular cross-section. In another embodiment, not described, the first ends 40a, 41a and the second ends 40b, 41b may have a generally non-circular cross-sectional shape, for example oblong or elliptical.

The ring 12 is generally L-shaped in axial cross-section and comprises a cylindrical portion 12b, one axial end of which is connected to a radially outer annular flange 12a for attaching the studs 40, 41.

The cylindrical portion 12b of the ring 12 comprises at its inner periphery an annular gorge 12c for rolling the balls of the bearing 14 and at its outer periphery an outer cylindrical surface 12d defining with the support 16 an annular space for forming a damping oil film.

The support 16 is partially shown in the drawings.

The support 16 comprises a first cylindrical wall 16b extending around the cylindrical portion 12b of the ring 12 and comprising an inner cylindrical surface 16a defining with the surface 12d the aforementioned damping oil film forming space.

The support 16 comprises a second cylindrical wall 16c extending around the first cylindrical wall 16b, or even around the flange 12a of the ring 12. The first and second cylindrical walls 16b, 16c are joined together by a substantially radial annular wall 16d comprising openings 46 through which the bodies 40c, 41c of the studs 40, 41 pass with clearance. Advantageously, the openings 46 are generally circular in cross-section.

In the example shown, it can be seen that the studs 40, 41 pass through an annular space formed between the walls 16b, 16c. The wall 16d is located at one axial end of this space.

The support 16 also comprises an annular flange 16e.

Figure 4:
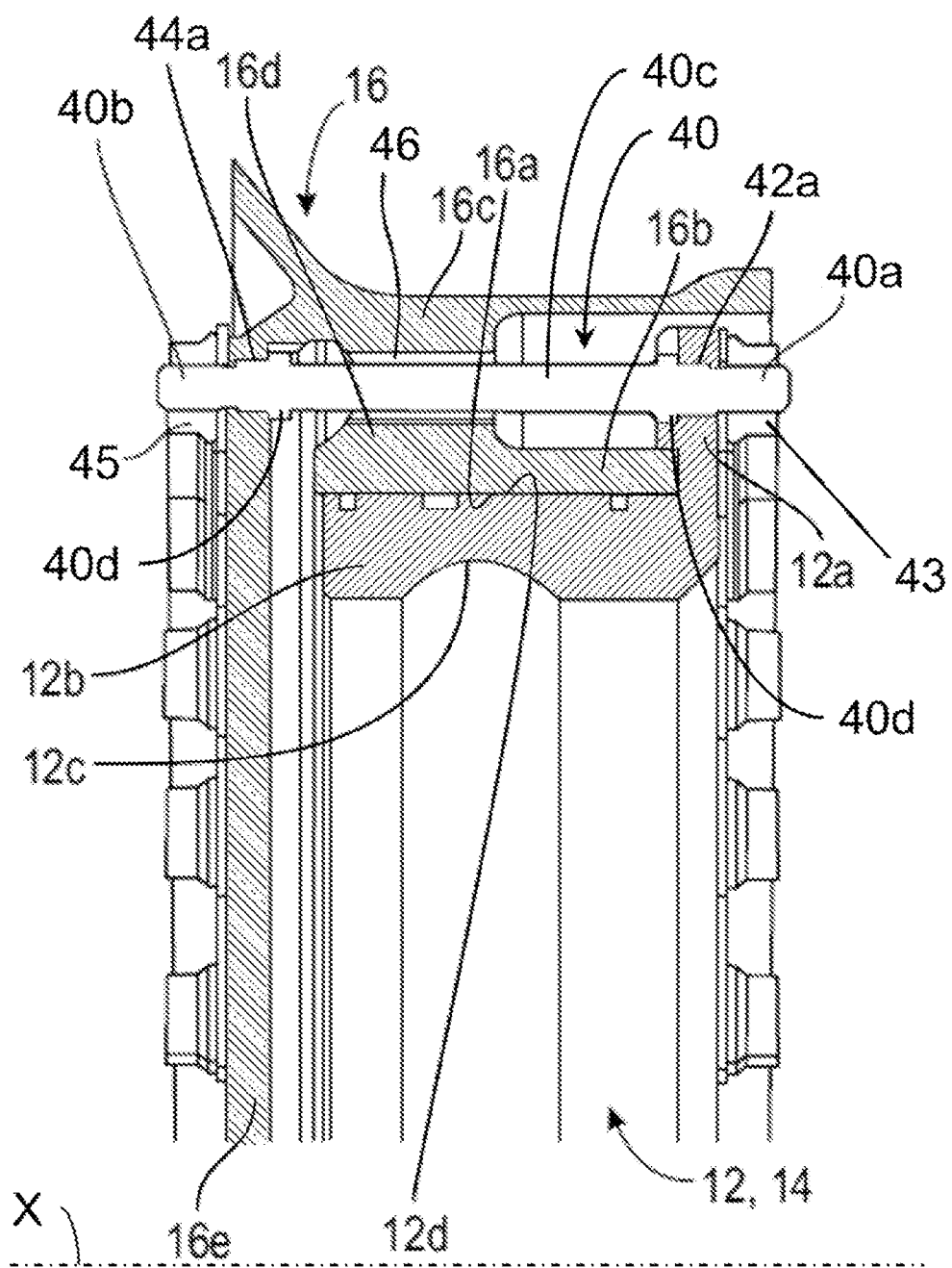
FIG. 4 is a schematic axial sectional view of the device in FIG. 3 along the section axis I-I.
Figure 5:
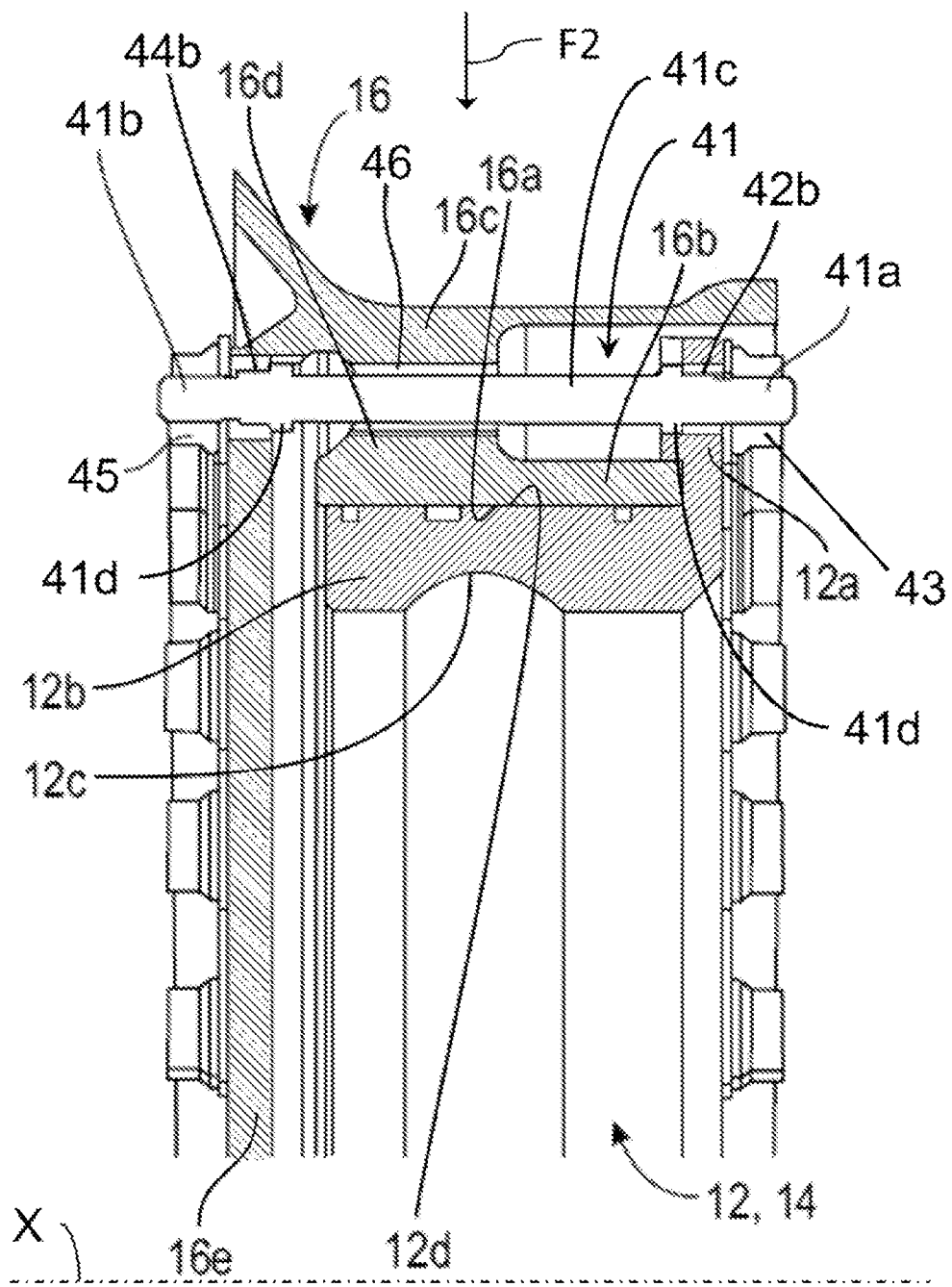
FIG. 5 is a schematic axial sectional view of the device in FIG. 3 along the section axis II-II.

The orifices 42a, 42b in the ring 12 and the orifices 44a, 44b in the support 16 may comprise first orifices 42a, 44a and second orifices 42b, 44b. Advantageously, the first orifices 42a, 44a are generally circular in cross-section. Alternatively, not shown, the first orifices 42a, 44a may have a non-circular general cross-sectional shape, for example oblong or elliptical. In this way, the corresponding ends 40a, 40b of the first studs 40 can be engaged without clearance in the ring 12 and in the support 16, as shown in FIG. 4, which shows a sectional view of the device in FIG. 3 along the section axis I-I. It is understood that by being engaged without clearance in the ring 12 and in the support 16, the ends 40a, 40b of the first studs 40 have a circular cross-section when the first orifices 42a, 44a have a generally circular cross-sectional shape, or alternatively the ends 40a, 40b of the first studs 40 have a non-circular cross-section when the first orifices 42a, 44a have a generally non-circular cross-sectional shape. It is also understood that the size of each of the ends 40a, 40b is substantially equal to the size of each of the first orifices 42a, 44a.

Advantageously, the cross-section of the second orifices 42b, 44b is generally oblong or elliptical. Alternatively, not shown, the second orifices 42a, 44a may be generally circular in cross-section. In this way, the corresponding ends 41a, 41b of the second studs 41 can be engaged with clearance in the ring 12 and in the support 16. As shown in the example in FIG. 5, which shows a cross-sectional view of the device in FIG. 3 along the cross-sectional axis II-II, the second orifices 42b, 44b may have an elongated shape, preferably in the same direction. It is understood that the elongated shape of the orifices 42b, 44b means that they have a first longitudinal dimension greater than a second dimension, substantially perpendicular to the first. It is also understood that the first longitudinal dimension is greater than the diameter of the ends 41a, 41b of the studs 41, and that the second dimension is substantially equal to the diameter of the ends 41a, 41b. In other words, there is a clearance with the studs 41 only in a longitudinal direction. In another embodiment, not shown, there may be a clearance between the ends 41a, 41b of the second studs 41, which are circular in cross-section, and the second orifices 42b, 44b, which are generally circular in cross-section. In this embodiment, the diameter of the second orifices 42b, 44b is greater than the diameter of the ends 41a, 41b and the clearance is uniformly positive in all directions. In yet another embodiment, not shown, there may be a clearance between the ends 41a, 41b of the second studs 41, which are non-circular in cross-section, for example oblong or elliptical, and the second orifices 42b, 44b, which are generally circular in cross-section. It is understood that, in this embodiment, the cross-section of the ends 41a, 41b may have an elongated shape, preferably in the same direction. The elongated shape of the ends 41a, 41b means that they have a first longitudinal dimension greater than a second dimension, substantially perpendicular to the first. It is therefore understood that there is clearance when the diameter of the second orifices 42b, 44b is substantially equal to the first longitudinal dimension of the cross-section of the ends 41a, 41b. In other words, there is a clearance with the studs 41 only in a direction perpendicular to the first longitudinal dimension.

The orifices 42a, 42b can be formed in the flange 12a. The orifices 42a are passed through by the ends 40a of the studs 40 and the orifices 42b are passed through by the ends 41a of the studs 41; these ends 40a, 41a can be threaded and receive nuts 43 tightened against the flange 12a.

The orifices 44a, 44b can be formed in the flange 16e. The orifices 44a are passed through by the ends 40b of the studs 40 and the orifices 44b are passed through by the ends 41b of the studs 41; these ends 40b, 41b can be threaded and receive nuts 45 tightened against the flange 16e.

The body 40c, 41c of each stud 40, 41 can be connected to each of the ends 40a, 40b, 41a, 41b by annular collars 40d, 41d. The collars 40d, 41d may comprise a flattened area which can be supported on the flanges 16e, 12a of the support 16 and of the ring 12 respectively, so that rotation of the studs 40, 41 about their longitudinal axis can be prevented.

Figure 6:
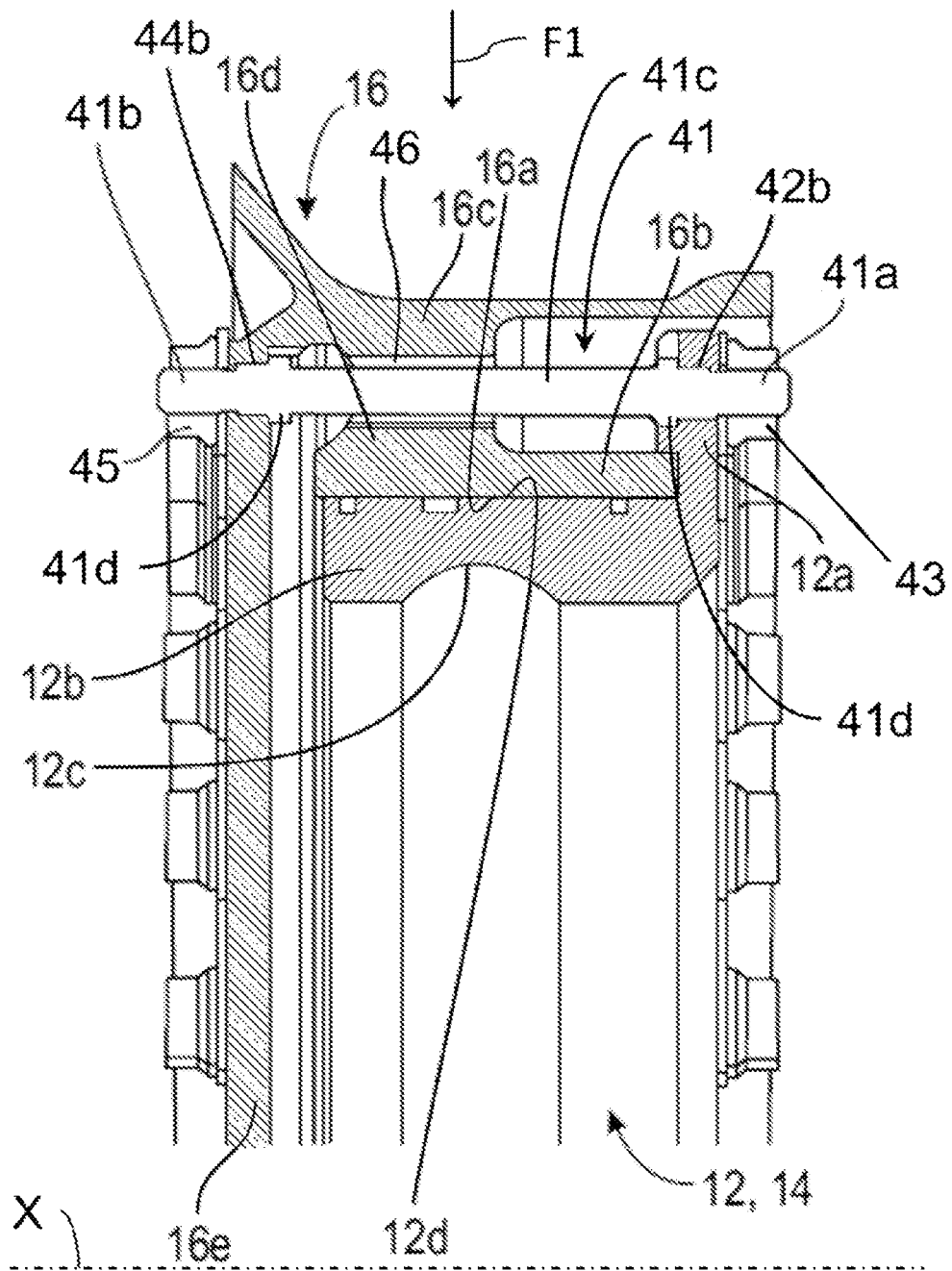
FIG. 6 is a schematic axial sectional view of the device in FIG. 3 along the section axis III-Ill.

In the example shown in FIG. 3, the cage 10 is not axisymmetric with respect to the axis X and its stiffness is not axisymmetric either. The stiffness of the cage 10 in a transverse direction parallel to the planes P (arrow F2) is greater than the stiffness of the cage 10 in a direction perpendicular to these planes P (arrow F1). Indeed, when the cage 10 is loaded in the direction parallel to the planes P (arrow F2), only the first studs 40 work, generating a certain stiffness. The second studs 41, engaged with clearances in the orifices 42b, 44b in the ring 12 and the support 16, can move in the direction of the load F2 in the clearance in the orifices 42b, 44b. In this way, part of the load F2 can be absorbed. When the cage 10 is loaded in the direction perpendicular to the planes P (arrow F1), all the studs 40, 41 are loaded, and the stiffness of the cage 10 is greater. This is because the second studs 41 cannot move in this direction in the orifices 42b, 44b, as shown in FIG. 6, which illustrates the cross-sectional view of the device in FIG. 3 along the cross-sectional axis III-Ill, parallel to the load F1. In other words, when the cage 10 is loaded in a given direction and the clearances of the orifices 42b, 44b are oriented in this same given direction, such as the direction parallel to the planes P (arrow F2), the stiffness is lower in this given direction. It is understood that when the device is loaded in a first direction (arrow F2) perpendicular to the axis X, the second studs 41 move in the clearances, while the first studs 40 remain stationary, and that when the device is loaded in a second direction (arrow F1) perpendicular to the axis X, different from the first direction, the first studs 40 and the second studs 41 remain stationary in their respective orifices 42a, 42b, 44a, 44b. Different stiffnesses are thus obtained depending on the direction of the loads.

The invention also relates to an aircraft turbine engine comprising at least one device as described above.

The device and the flexible cage according to the invention are therefore advantageous in that the stiffness of the cage differs according to the angular position of the force transmitted to the cage in a direction transverse to its main axis.

The invention claimed is:

1. A device for centering and guiding an aircraft turbine engine shaft, the device comprising:
   an outer ring of a rolling bearing, the ring extending about an axis and comprising orifices arranged about the axis and oriented parallel to the axis,
   an annular bearing support extending around the axis and at least partly around the ring, the support comprising orifices arranged around the axis and oriented parallel to the axis, and
   a series of studs connecting the ring to the support, the studs being distributed around the axis and extending substantially parallel to this axis, each of the studs comprising a first longitudinal end engaged in one of the orifices of the ring and a second longitudinal end engaged in one of the orifices of the support,
   wherein some of the studs, referred to as first studs, have ends engaged without clearance in the orifices of the ring and in the orifices of the support, and the other studs, referred to as second studs, have ends engaged with clearances in the orifices of the ring and/or the orifices of the support, the clearances being configured so that the device has different stiffnesses in at least two directions perpendicular to the axis.

2. The device of claim 1, wherein the at least two directions are perpendicular to each other.

3. The device of claim 1, wherein the first studs alternate with the second studs around the axis.

4. The device of claim 1, wherein the first and second ends of the studs are circular in cross-section.

5. The device of claim 4, wherein the orifices of the ring and of the support comprise first orifices having a circular cross-sectional shape, and second orifices having an oblong or elliptical cross-sectional shape.

6. The device of claim 5, wherein the second orifices are oriented so that they have an elongated shape in the same direction.

7. The device of claim 1, wherein the orifices are formed in annular flanges of the ring and of the support.

8. The device of claim 1, wherein the ring comprises an outer cylindrical surface defining with an inner cylindrical surface of the support an annular space for forming a damping oil film.

9. An aircraft turbine engine comprising at least one device according to claim 1.

* * * * *